No. 787,232. PATENTED APR. 11, 1905.
G. B. TAYLOR.
HINGE CUTTING MACHINE.
APPLICATION FILED JULY 6, 1903.

Witnesses.                              Inventor.

No. 787,232. PATENTED APR. 11, 1905.
G. B. TAYLOR.
HINGE CUTTING MACHINE.
APPLICATION FILED JULY 6, 1903.

Witnesses.
Geo. Fuerst
Harry Davis

Inventors.
George Benjamin Taylor

No. 787,232. PATENTED APR. 11, 1905.
G. B. TAYLOR.
HINGE CUTTING MACHINE.
APPLICATION FILED JULY 6, 1903.

WITNESSES.
Geo. Fuess
Harry Davis

INVENTOR.
George Benjamin Taylor

No. 787,232.

Patented April 11, 1905.

UNITED STATES PATENT OFFICE.

GEORGE BENJAMIN TAYLOR, OF BIRMINGHAM, ENGLAND.

HINGE-CUTTING MACHINE.

SPECIFICATION forming part of Letters Patent No. 787,232, dated April 11, 1905.

Application filed July 6, 1903. Serial No. 164,456.

*To all whom it may concern:*

Be it known that I, GEORGE BENJAMIN TAYLOR, engineer, a subject of the King of Great Britain, residing at 43 Bartholemew street, Birmingham, in the county of Warwick, England, have invented certain new and useful Improvements in Hinge-Cutting Machines, of which the following is a specification.

This invention relates to a hinge-cutting machine, the object being to provide a device of this character for rapidly and accurately cutting hinge-blanks.

The improvements will be hereinafter made clear by the aid of the accompanying sheets of drawings, reference-letters being used to indicate the different parts.

Figure 1 is an axial section, and Fig. 2 is a plan, of a machine comprehending features of the improvements, such machine being specially designed for facing the ends of butt-hinge blanks. Figs. 3 and 4 are views similar to Figs. 1 and 2, showing the machine adapted for cutting the gaps in the knuckle parts of hinge-blanks. Figs. 5 to 10 are detail views illustrating modified constructions and arrangements of cutters for acting on different objects.

In this machine the cutter is spiral in respect of the axis and the work is concentric in respect of the axis.

Two cutters $a$ and $c$ are used, such being similar in formation and being non-rotating on a definite axis $d$, supporting them, the said axis being also non-rotating in the central bearing $d^2$ of a circular table $e$, forming the base or bed of the machine, this base or bed being itself supported in some suitable manner. The cutters are each an incomplete active convolution of a spiral, as will be clearly seen from Fig. 2, which shows the upper cutter $a$. The active part of the spiral convolution is $f' f^2 f^3$, while the inactive part is $f g f^3$, this inactive portion enabling the blanks to be faced to be taken from and fed into recesses or pockets $i$ of a work-carrier $l$, which is supported upon the bed or base $e$ of the machine to rotate, the said carrier having definite bearing on the table $e$ at $l^2$ and being turned by a worm-gear $l^3 l^4$, driven in some suitable way. The recesses or pockets $i$ are provided in the carrier $l$, so as to be concentric with the definite axis $d$, the butt-hinge blanks being held in these recesses or pockets, so that their ends are acted upon simultaneously by the cutters $a$ and $c$ as the carrier $l$ rotates, the said cutters being spaced apart on the axis $d$ to the finished length of the butt-hinge blanks. It will be quite obvious that the carrier $l$ may be supported and turned in various ways, the only important feature in respect of it being that the recesses or pockets in it to carry the work must rotate in a path concentric with the axis $d$.

Each blank fed into the carrier $l$ is faced on both its ends and is withdrawn from the said carrier during one complete rotation of the said carrier. For instance, the blank $h$, Fig. 2, has just been fed into one of the recesses or pockets, while the one, $h^2$, is just about to leave its particular pocket after having been faced on both its ends by the cutters $a$ and $c$, the blank to be faced being carried round by the carrier $l$ and gradually step by step operated upon by the teeth of the cutters, this step-by-step operation being clearly represented by Fig. 2. The faced blank $h^2$ drops out of its recess or pocket by its own weight and drops down the guide-tube $m$, supported by the stationary table $e$, to conduct the said blank to a suitable receiver. The blank $h$, which has just been fed into the pocket or the recess, drops onto a rest $n$, which is adjustably carried at $n^2$ within the table $e$, this rest extending from the point $o$ to the point $o^2$ and being for the purpose of preventing the said blank dropping through before it is sufficiently in contact with the cutters $a$ and $c$ to hold it. The butt-hinge blank $h$ (represented in Fig. 1) shows the position of the blanks with respect to the two cutters, its lower end resting upon the rest $n$, the cutters not yet having caught hold of it. It will be seen that the blanks are fed into and are taken from the pockets or recesses at the inactive opposite portions $f g f^3$ of the cutters $a$ and $c$.

The adaptation of the features as aforesaid in a machine for cutting the gaps in the knuckle parts of hinge-blanks is represented by the section Fig. 3 and plan Fig. 4. In this machine three cutters $a'$, $c'$, and $s'$ are mounted upon the stationary definite axis $d$, but the disposition of their active surfaces in respect of each other and in respect of the definite axis is the same as the two cutters in the machine, Figs. 1 and 2. Three cutters are used in this machine, because the hinge-blanks require to have three gaps put in their knuckle portions; but it will be obvious that any number of cutters may be arranged in the manner defined upon the stationary definite axis $d$. In this machine the table $e$ and work-carrier $l$ are substantially as in Figs. 1 and 2, the only important difference being that the pockets or recesses $i'$ to receive the blanks are of different shape and formation. Inactive parts in the cutters $a'$, $c'$, and $s'$ are provided in much the same way as the similar parts in the cutters, Figs. 1 and 2. In this machine devices are represented for setting the pockets or recesses $i'$ in the carrier; but the effect of these devices may be otherwise obtained, and therefore they form no part of the present invention, particularly so as the carrier $l$ can be made interchangeable in any machine. The inactive parts of the cutters are really gaps in the cutters, and they may be made much more decisive, if such is necessary, in order to put the work into the machine and take it therefrom, it being understood that the operation of the work is commenced and finished in one rotation of the carrier. It will be understood that the work-carrier $l$ may be stationary and the cutters made to revolve with the same result.

A sheet of diagrams shows different adaptations of the features of the invention hereinbefore described.

Figure 1:
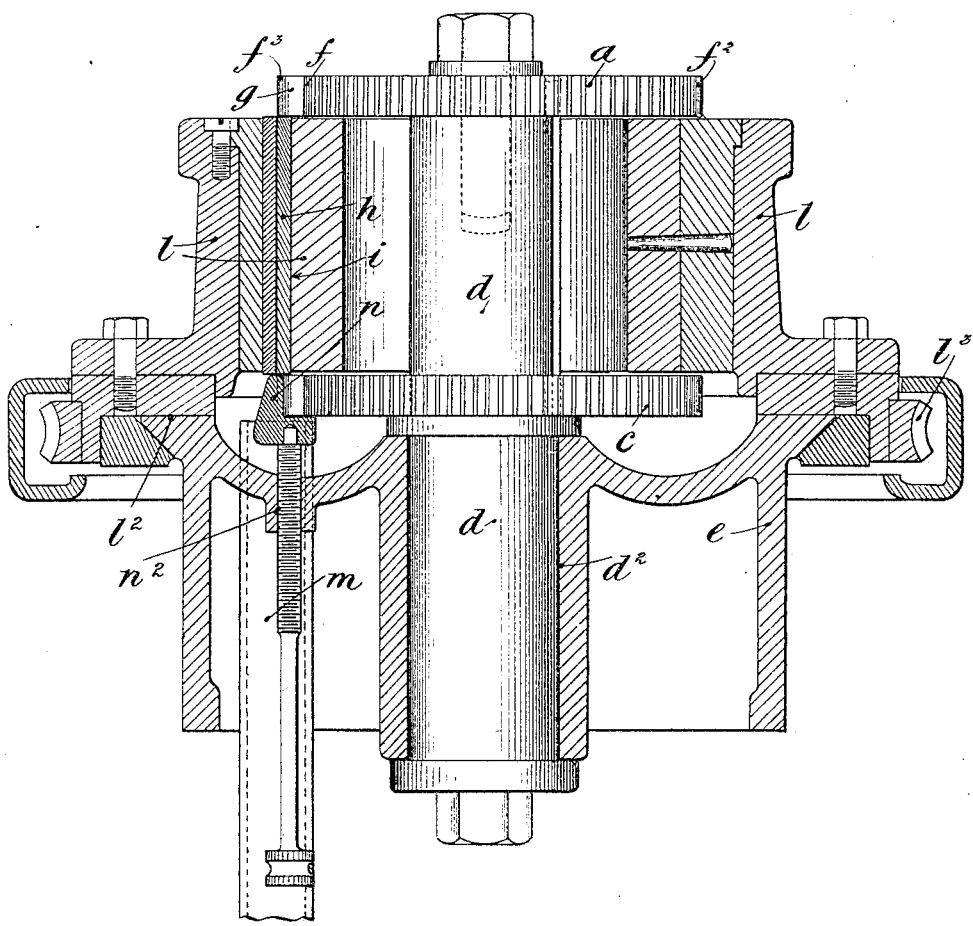
Figure 2:
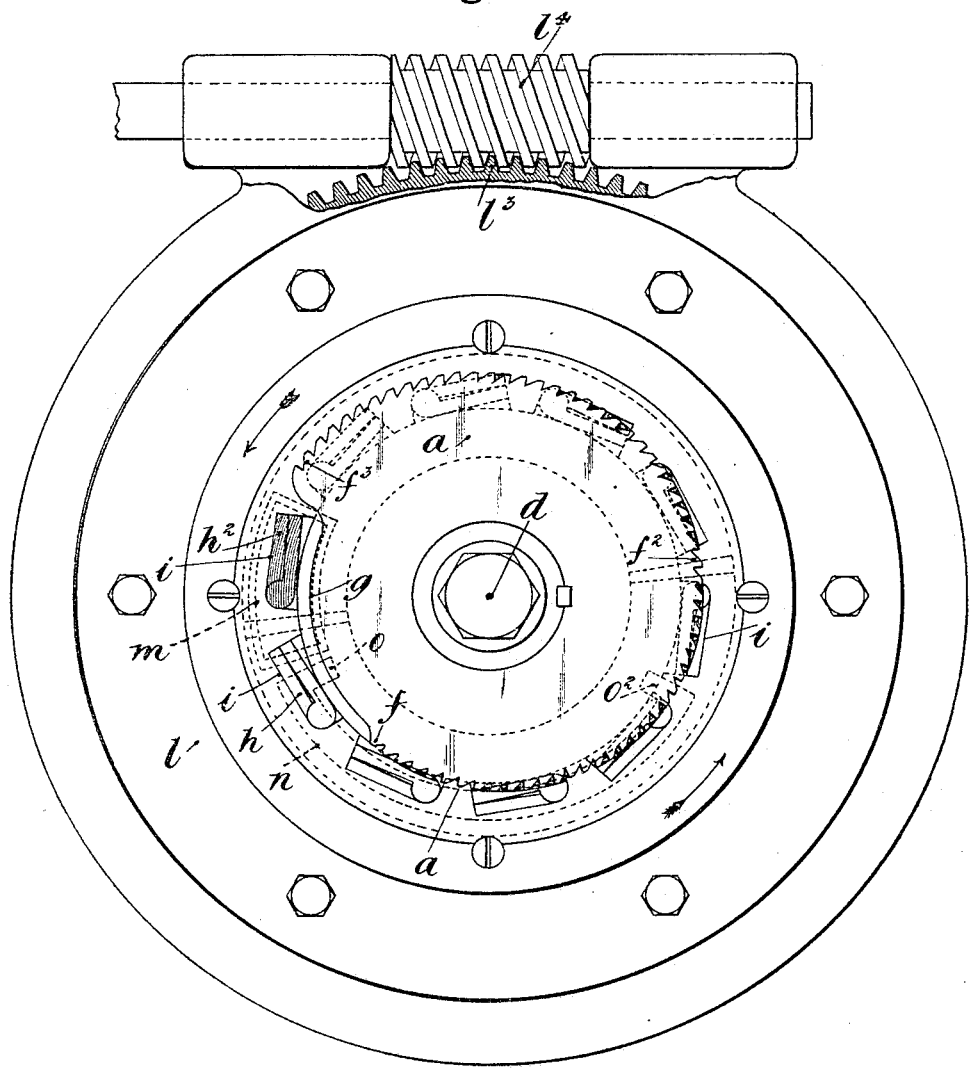
Figure 3:
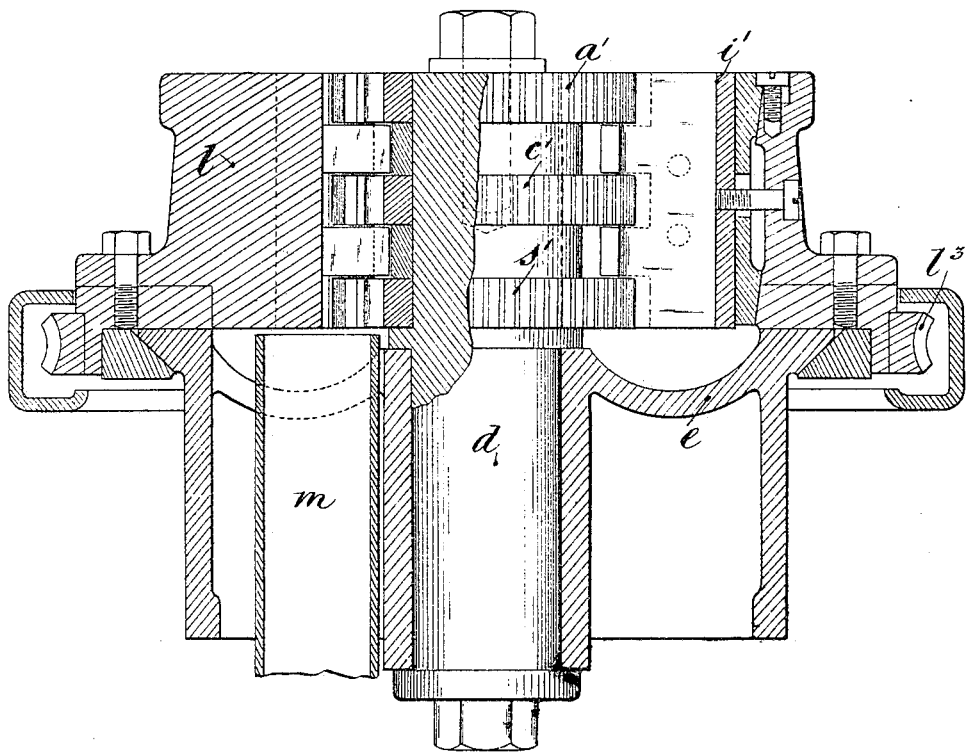
Figure 4:
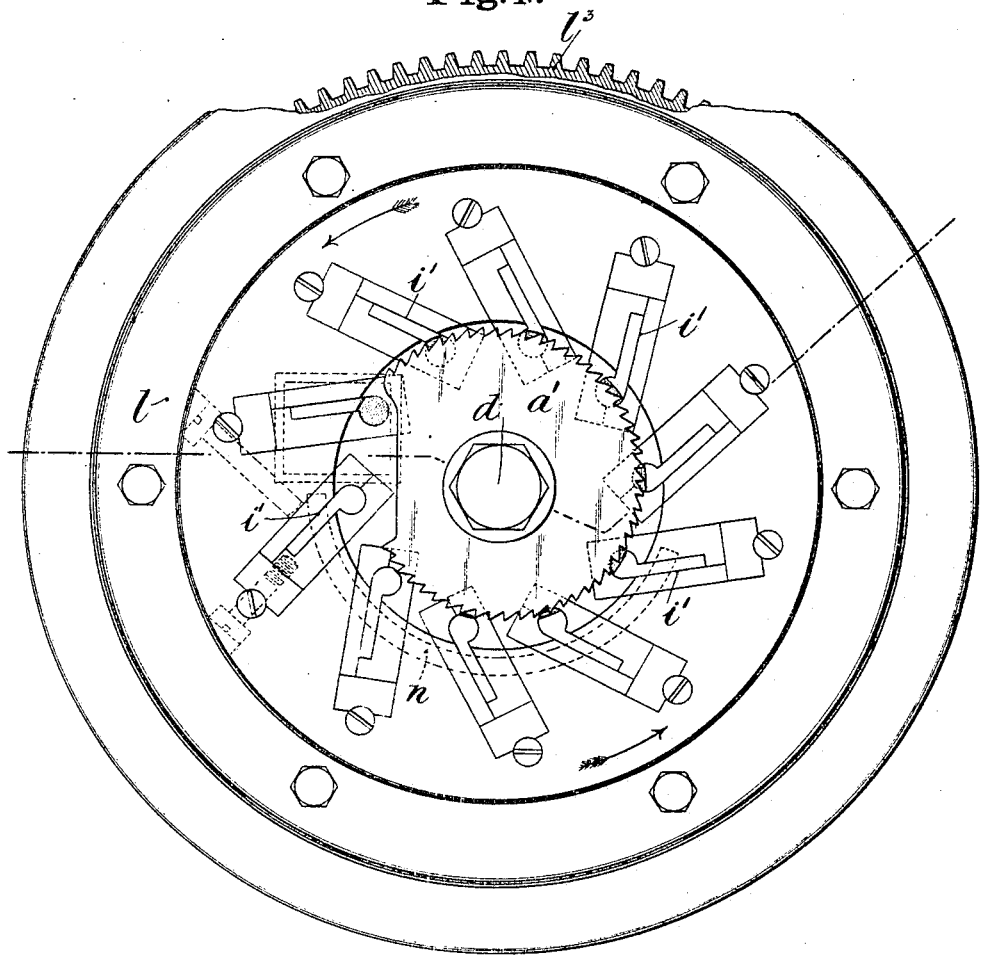
Figure 7:
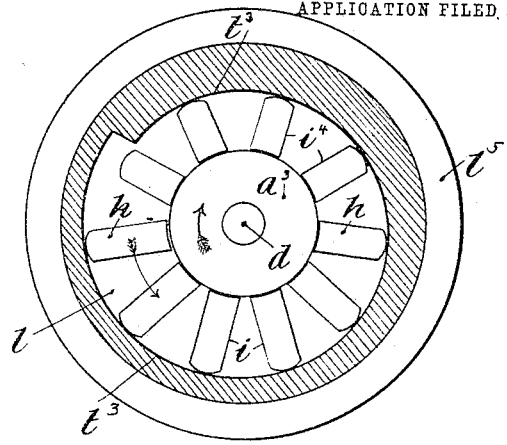
Figure 6:
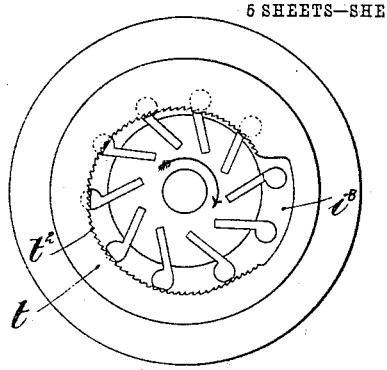
Fig. 6 shows how the active face of the cutter may be the inner edge $t^2$ of a ring $t$, the cutter being stationary and the work revolving, the said cutter having a gap or non-active part $i^3$ for the purposes as aforesaid.

In Fig. 7 the cutter $a^3$ is a revolving emery-wheel or the like concentrically mounted on the axis $d$, while the stationary work-carrier $l^5$ has a revolving spiral or like path $t^3$ upon it, which serves to force the articles $h$ step by step into cutting contact with the emery-wheel, the said articles being by the spiral path made to slide in the pockets or recesses $i^4$ holding them.

Figure 8:
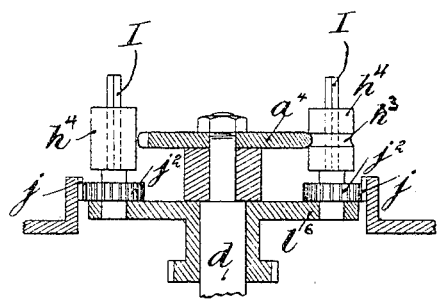
Figure 5:
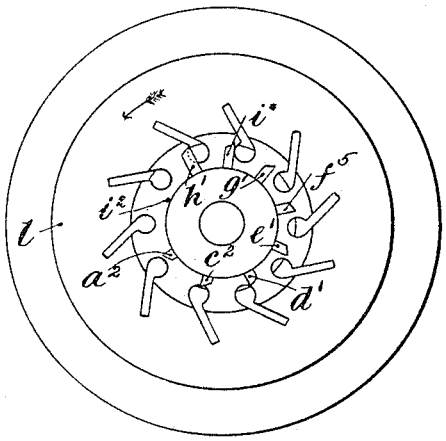
Fig. 5 shows how a cutter may be formed by an incomplete spiral convolution of separate cutters $a^2$, $c^2$, $d'$, $e'$, $f^5$, $g'$, $i$, and $h'$, leaving an inactive portion $i^2$, the work-carrier $l$ revolving and the said cutters being stationary.

Fig. 8 shows a stationary spiral cutter $a^4$ and a concentric rotating work-carrier $l^6$, $d$ being the definite axis. The articles $h^4$ are carried upon spindles I, which are caused to revolve as the work-carrier is turned by a stationary toothed annulus $j$ and pinions $j^2$, these spindles rotating the work with them, so that in this arrangement while the work is carried round by the carrier it also is made to itself rotate, this arrangement in a machine being useful for many purposes—such as, for instance, for machining a circular groove $h^3$ in the work.

Figure 9:
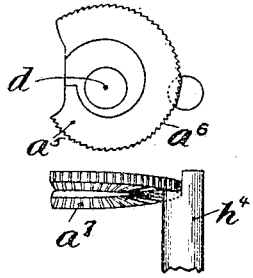

Fig. 9 illustrates a cutter $a^5$ with an active spiral face $a^6$ and also with an active helical face $a^7$, $d$ being the axis, this cutter being useful for various purposes of machining. The work $h^4$ is carried by the carrier, as before referred to, and is operated upon both vertically and horizontally.

Figure 10:
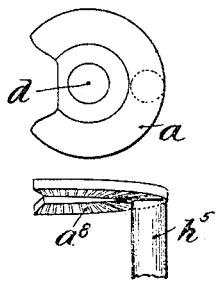

Fig. 10 shows the cutter concentric with the axis $d$, but having a helical active face $a^8$, $h^5$ being the work.

The stock or blanks to be operated upon may be fed to the machine in any desirable way.

Having now described my invention, what I claim, and desire to secure by Letters Patent, is—

1. In a machine of the character described, the combination with a substantially convolute disk-shaped cutter, of a circular carrier for the articles to be cut, one of said parts being stationary and the other rotatable, the cutter having a recessed inactive portion on its periphery for the insertion and removal of the articles in and from the carrier, substantially as and for the purpose specified.

2. In a machine of the character described, the combination of a stationary and approximately convolute disk-shaped cutter, a rotatable carrier for the articles to be cut provided with a circular series of pockets concentric with the center of the carrier to hold said articles, said cutter being recessed on one portion of its edge for the insertion and removal of the articles in and from said pockets, and means for rotating the carrier, substantially as and for the purpose specified.

3. In a machine of the character described, the combination of a stationary and approximately convolute disk cutter, a circular rotatable carrier provided with a circular series of pockets concentric with the center of the carrier to hold said articles, said cutter being arranged above the carrier and recessed on one portion of its edge for the insertion of the articles in said pockets, and means for rotating the carrier to successively present the articles to the convolute cutting edge of the cutter, substantially as and for the purpose specified.

4. In a machine of the character described, the combination with a disk cutter having a mutilated convolute cutting edge, of a circular carrier for holding the articles to be operated on, one of said parts being arranged above the other and in close juxtaposition thereto, and means for rotating one of said parts to cause the articles to be successively operated on by the convolute cutting edge of the cutter, substantially as and for the purpose specified.

In testimony whereof I have hereunto set my hand in presence of two subscribing witnesses.

GEORGE BENJAMIN TAYLOR.

Witnesses:
    GEO. FUNK,
    HARRY DAVIS.